Sept. 20, 1960 S. T. VOLL 2,953,314
MAGNETIC BRAKE FOR FISHING REEL
Filed Feb. 3, 1958
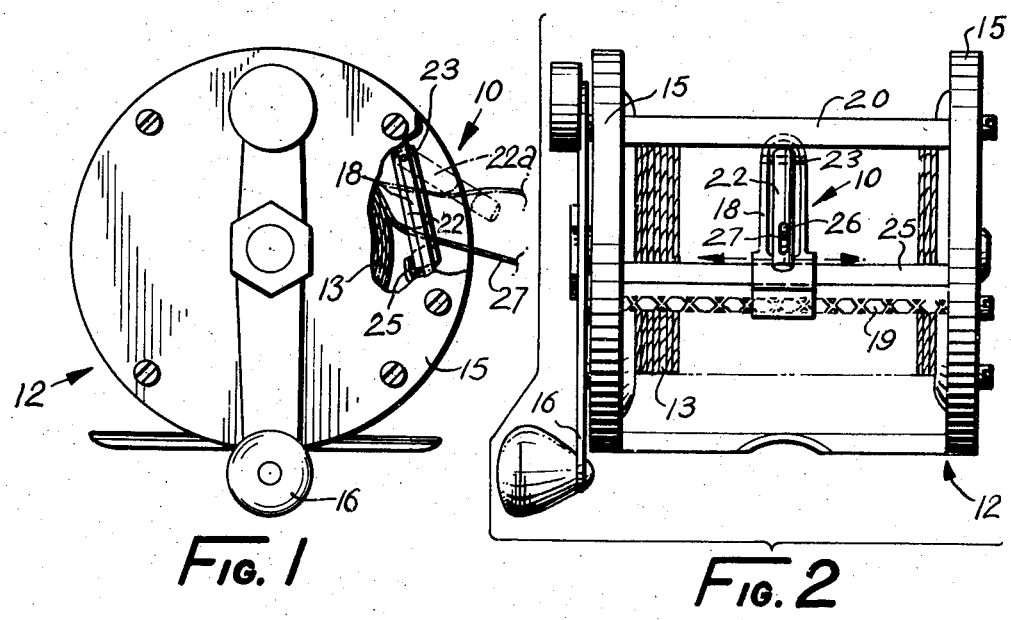
FIG. 1   FIG. 2
FIG. 4
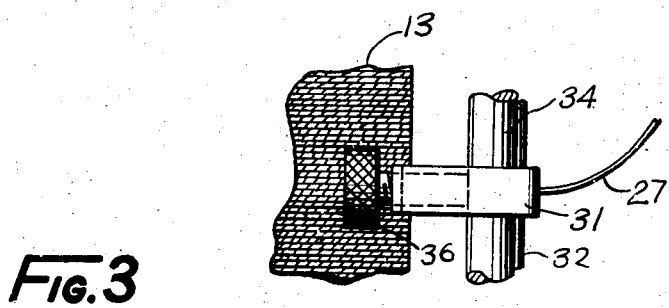
FIG. 3
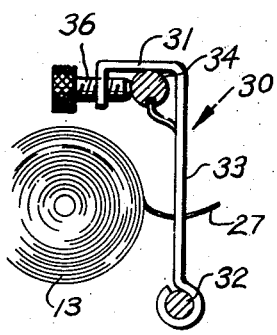
Samuel T. Voll.
INVENTOR.

2,953,314
MAGNETIC BRAKE FOR FISHING REEL

Samuel T. Voll, Great Falls, Mont., assignor to Gadget-Of-The-Month Club, Inc., North Hollywood, Calif., a corporation of California Filed Feb. 3, 1958, Ser. No. 712,740

5 Claims. (Cl. 242—84.52)

This invention relates to fishing apparatus and more particularly to a fishing reel.

It is an object of the present invention to provide a level wind fishing reel having automatic magnetic brake means for exerting a drag upon the level wind mechanism to prevent back lash during casting.

Another object of the present invention is to provide a fishing reel of the above type in which the parts are permitted to run free regardless of the velocity at which the line is drawn from the drum so long as there is a constant drag upon the line, and which will automatically exert a drag upon the mechanism in response to a slack in the line being drawn from the drum.

Other objects of the invention are to provide a fishing reel bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view, with parts broken away, of a fishing reel made in accordance with the present invention;

Figure 2 is a front elevational view of the apparatus shown in Figure 1;

Figure 3 is a fragmentary transverse cross sectional view of a modified form of construction; and Figure 4 is a fragmentary top plan view of the device shown in Figure 3.

Referring now more in detail to the drawing, and more particularly to Figures 1 and 2 thereof, a magnetic brake device 10 made in accordance with one form of the present invention is shown in operative association with a level wind type fishing reel 12 having a drum 13 that is rotatably supported upon spaced apart side plates 15. As is well known to those skilled in the art, gearing is provided for rotating the drum 13 in response to rotation of the handle 16. A level wind bracket 18 is supported for reciprocating longitudinal movement along a feed bar 19 for traversing the drum 13 in response to rotation thereof so as to remove line from and lay line upon the drum in a smooth and even manner. A guide bar 20 parallel to and spaced from the feed bar 19 engages the opposite end of the bracket 18 to provide sufficient balance and minimize normal resistance to longitudinal movement of the bracket.

A magnetized element 22 is pivotally supported at its uppermost end by means of a pivot pin 23 to the upper portion of the bracket 18. A longitudinal friction member 25 fixed to the feed bar 19 is disposed intermediate the opposite free end of the magnetized element 22 and the drum. This friction member is also of a magnetic material so as to attract the free end of the magnetized element 22 and normally prevent relative longitudinal movement therebetween. The free end of the fishing line 27 extends through a longitudinal slot 26 adjacent to the free end of the magnetized element 22 for guiding action by the level wind bracket 18 and for controlling the position of the magnetized element 22.

In actual use, the free end of the magnetized element 22 is normally in frictional engagement with the friction member 25 by virtue of the magnetic attraction therebetween. However, in response to a pull upon the free end of the line 27 that extends through the slot 26 of the magnetized element 22, the free end of the magnetized element is pulled away from the friction member to release the magnetic coupling and eliminate the frictional resistance to free operation of the level wind mechanism and reel. However, as soon as slack develops in the line, the magnetized element 22 is automatically attracted into engagement with the friction member 25, thus imparting a frictional drag to the reel and decreasing the speed of rotation of the drum, thus preventing back lash in the line automatically. However, immediately following the take up of the slack, the renewed pull upon the line will again disengage the magnetized element from the friction member to provide free reeling until the next slack is encountered during the cast.

In Figures 3 and 4 of the drawing, a modified form of construction 30 is shown wherein the bracket 33 of the level wind mechanism supported upon the feed bar 32 is provided with an upward and rearward extension 31 that extends behind the guide bar 34. This extension 31 threadingly supports a magnetized screw 36 which can be adjusted relative to the guide bar 34 which is also of a magnetic material. With this mechanism, it is possible to establish a constant drag upon the reel which is particularly useful for heavy casting. By threading the magnetized screw 36 into closer relationship with the guide bar 34, the strength of the magnetic coupling is increased so as to increase resistance to relative longitudinal movement therebetween. By providing a greater space between the screw 36 and guide bar 34, this magnetic coupling is reduced so as to reduce the drag on the line during casting. This adjustment may be manually altered at any time and is independent of the particular pull or slack of the line.

While various changes may be made in the detail construction, it shall be understood that such changes shall be within the spirit and scope of the present invention as defined by the appended claims.

What I claim as new and desire to protect by Letters Patent of the United States is:

1. A fishing reel comprising, in combination, a pair of spaced-apart side plates, a drum rotatably supported upon said side plates, said side plates being of generally circular configuration and lying in spaced-apart parallel planes, said drum being concentrically supported relative to both of said side plates, a level wind device secured to said side plates and extending substantially parallel to a longitudinal axis of said drum, said level wind device including a reciprocating feed bracket supported for longitudinal traversing movement in laterally outwardly spaced relationship with said drum in response to rotation of said drum, magnetic means carried by said bracket resisting said reciprocating feed movement of said feed bracket and comprising a magnetized rod pivotally secured at one end to said bracket for pivotal movement in a plane normal to the longitudinal axis of said drum, and a friction bar carried by said level wind device intermediate said drum and the free end of said rod and adapted to be engaged by said magnetized rod.

2. The combination according to claim 1, wherein said drum supports a line, the free end of said line slidably threaded through said free end of said rod, whereby a pull on said line is operative to disengage said free end of said rod from said friction bar to prevent longitudinal movement of said feed bracket along said level wind device.

3. A fishing reel comprising, in combination, a pair of spaced-apart side plates, a drum rotatably supported upon said side plates, said side plates being of generally circular configuration and lying in spaced-apart parallel planes, said drum being concentrically supported relative to both of said side plates, a level wind device secured to said side plates and extending substantially parallel to a longitudinal axis of said drum, said level wind device including a reciprocating feed bracket supported for longitudinal traversing movement in laterally outwardly spaced relationship with said drum in response to rotation of said drum, and magnetic means carried by said bracket and magnetically coupled to said level wind device for resisting said reciprocating feed movement of said feed bracket.

4. The combination according to claim 3, wherein said level wind device includes a guide bar, and said magnetic means comprises an extension integral with said feed bracket extending behind said guide bar and a magnetized screw carried by said extension for adjustment relative to said guide bar.

5. The combination according to claim 4, wherein said magnetized screw is movable into proximity with said guide bar to increase the magnetic coupling therebetween to resist movement of said bracket.

References Cited in the file of this patent

UNITED STATES PATENTS

| | | |
|---|---|---|
| 2,465,932 | Romine | Mar. 29, 1949 |
| 2,598,846 | Smith et al. | June 3, 1952 |

UNITED STATES PATENT OFFICE
CERTIFICATE OF CORRECTION

Patent No. 2,953,314                                September 20, 1960

Samuel T. Voll

It is hereby certified that error appears in the above numbered patent requiring correction and that the said Letters Patent should read as corrected below.

In the grant, lines 2 and 3, for "assignor to Gadget-Of-The-Month Club, Inc., of North Hollywood, California, a corporation of California," read -- assignor of 1/10 to Gadget-Of-The-Month Club, Inc., of North Hollywood, California, a corporation of California, --; line 12, for "Gadget-Of-The-Month Club, Inc., its successors" read -- Samuel T. Voll, his heirs or assigns, and Gadget-Of-The-Month Club, Inc., its successors --; in the heading to the printed specification, lines 3 to 5, for "assignor to Gadget-Of-The-Month Club, Inc., North Hollywood, Calif., a corporation of California" read -- assignor of 1/10 to Gadget-Of-The-Month Club, Inc., North Hollywood, Calif., a corporation of California --.

Signed and sealed this 27th day of February 1962.

(SEAL)
Attest:

ERNEST W. SWIDER                                            DAVID L. LADD

Attesting Officer                                      Commissioner of Patents